(12) United States Patent
Nixon et al.

(10) Patent No.: US 8,359,791 B1
(45) Date of Patent: Jan. 29, 2013

(54) QUICK SNAP BIRD GUARD

(76) Inventors: David Glenn Nixon, Fayetteville, AR (US); Charles Calloway, Fayetteville, AR (US)

(*) Notice: Subject to any disclaimer, the term of this patent is extended or adjusted under 35 U.S.C. 154(b) by 0 days.

(21) Appl. No.: 13/302,240

(22) Filed: Nov. 22, 2011

Related U.S. Application Data

(63) Continuation of application No. 12/459,182, filed on Jun. 26, 2009, now abandoned.

(51) Int. Cl.
*E04B 1/72* (2006.01)

(52) U.S. Cl. .................. 52/101; 43/1; 256/11; 119/537; D22/120

(58) Field of Classification Search .................. 52/101; D21/120; 43/1; 256/11; 119/537
See application file for complete search history.

(56) References Cited

U.S. PATENT DOCUMENTS

| | | | |
|---|---|---|---|
| 564,591 A | 7/1896 | Clune et al. | |
| 2,777,171 A | 1/1957 | Burnside et al. | |
| 3,362,115 A | 1/1968 | Nyhus et al. | 52/101 |
| 4,159,395 A | 6/1979 | Cogelia | 174/136 |
| 4,309,072 A | 1/1982 | Tweeddale | 350/96.23 |
| 4,815,896 A | 3/1989 | Fox et al. | 405/158 |
| 5,058,335 A | 10/1991 | Richter | 52/101 |
| 5,293,721 A | 3/1994 | Richard et al. | 52/101 |
| 5,433,029 A | 7/1995 | Donoho et al. | 43/1 |
| 5,596,834 A | 1/1997 | Ritter | 43/124 |
| 5,615,524 A | 4/1997 | Costa, Sr. | 52/101 |
| 6,226,933 B1 | 5/2001 | Nelson et al. | 52/101 |
| 6,546,676 B2 | 4/2003 | Wiesener et al. | 52/101 |
| 6,640,506 B2 | 11/2003 | Landers | 52/101 |
| 2002/0073633 A1 | 6/2002 | Schlichting et al. | 52/101 |
| 2003/0046882 A1 | 3/2003 | Homer et al. | 52/101 |
| 2007/0271859 A1 | 11/2007 | Scheirs | 52/101 |

*Primary Examiner* — William Gilbert
(74) *Attorney, Agent, or Firm* — Keisling & Pieper PLC; David B. Peiper

(57) ABSTRACT

A bird guard having a body supporting outwardly extending projections for deterring birds and a pair of opposing elastically biased clamping ears for gripping onto a railing or cable. The use of body material and/or line hinges cast from elastic material are taught for biasing the clamping ears. An encasing apparatus is also taught using encasing ears. An adhesive strip is also taught for securing the encasing ears.

2 Claims, 4 Drawing Sheets

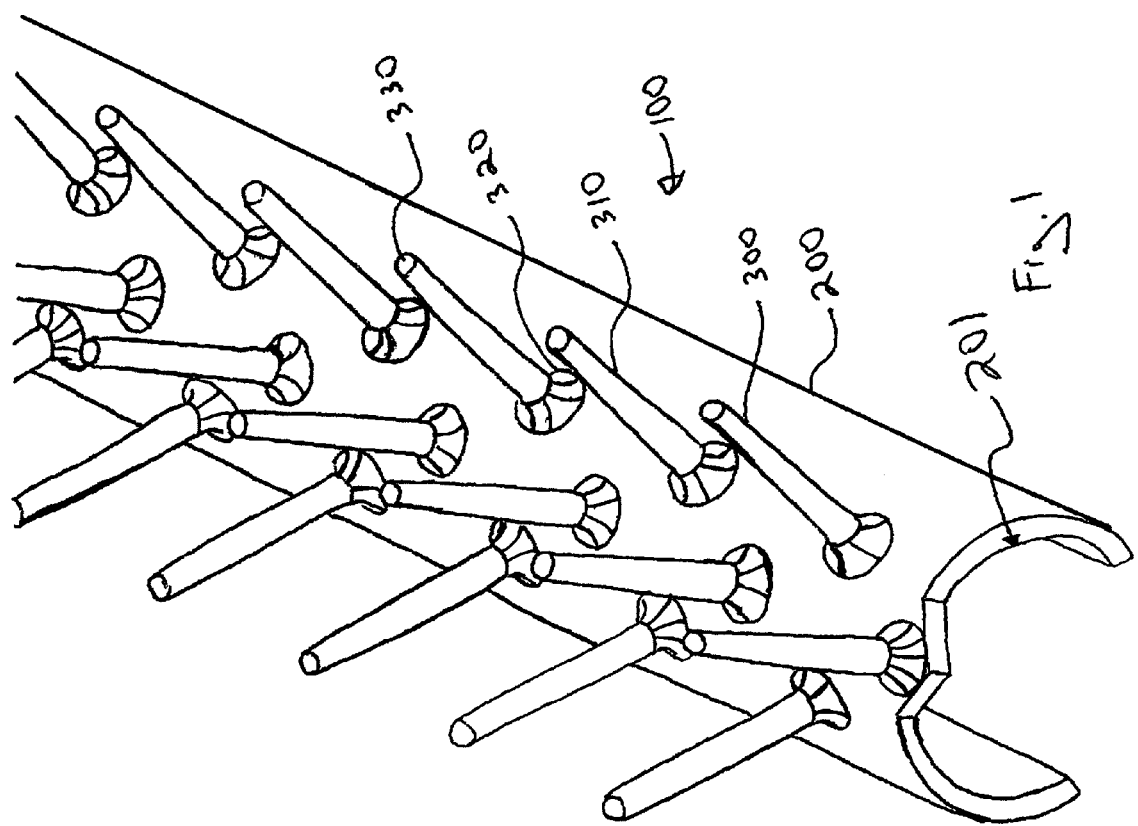

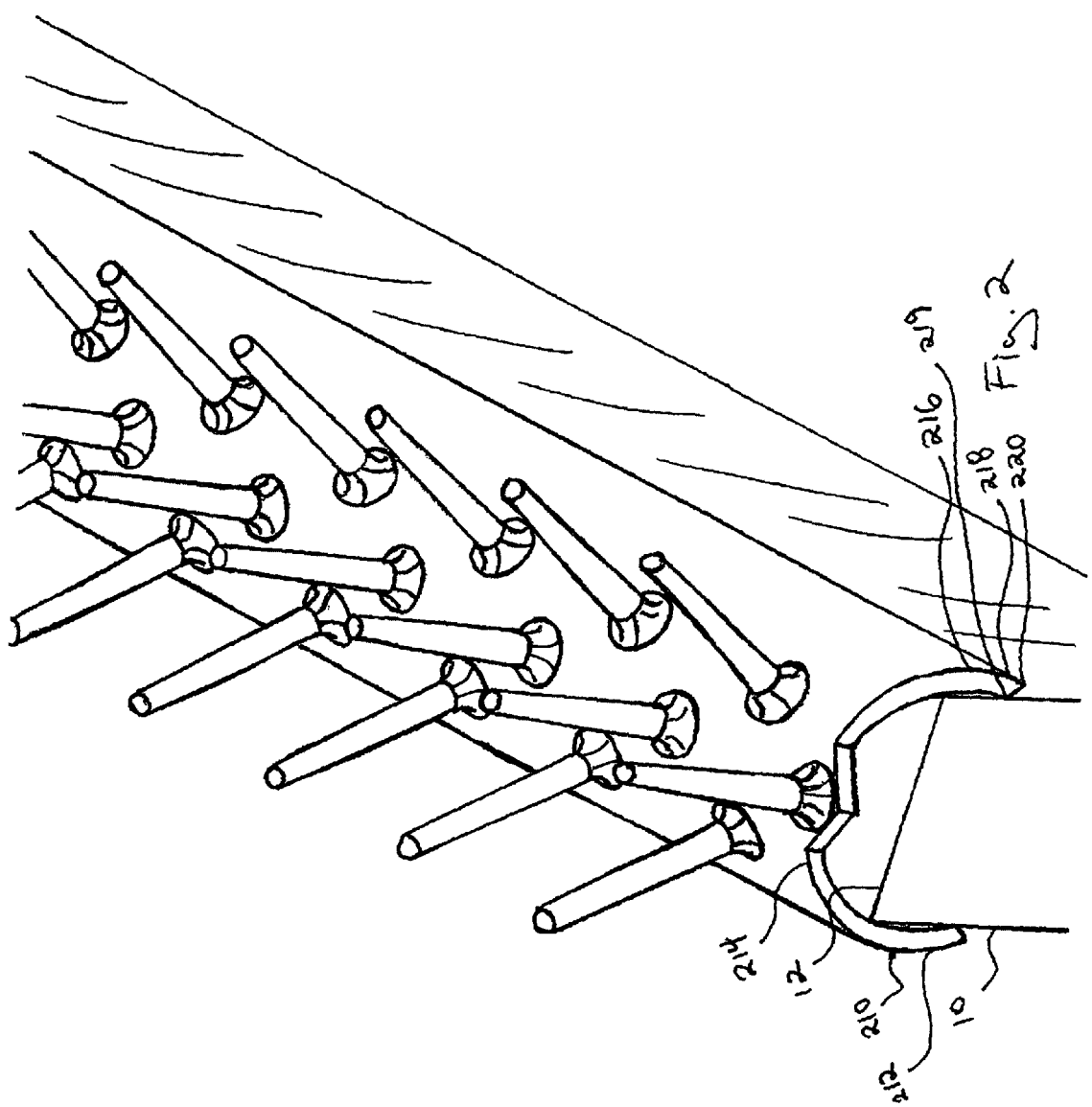

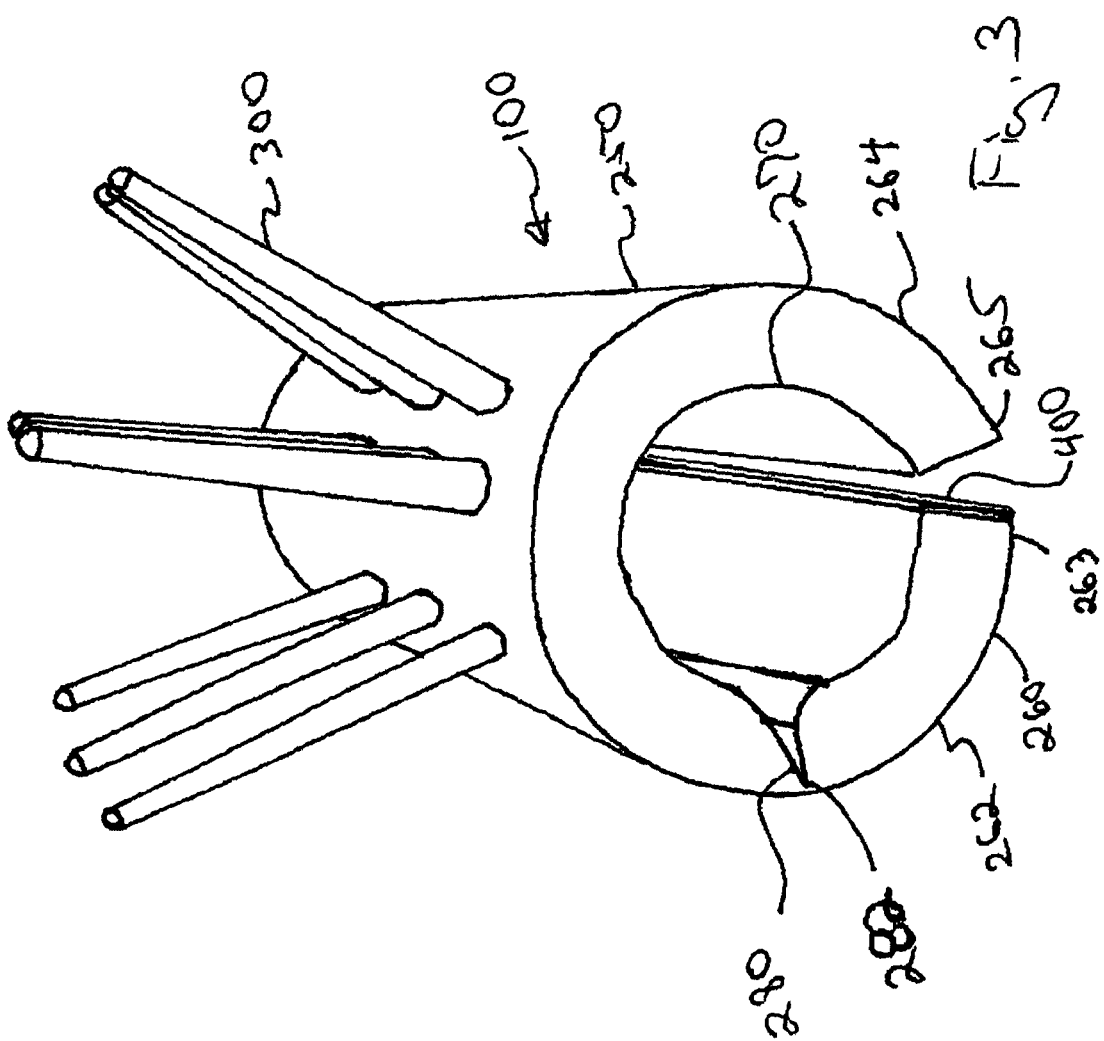

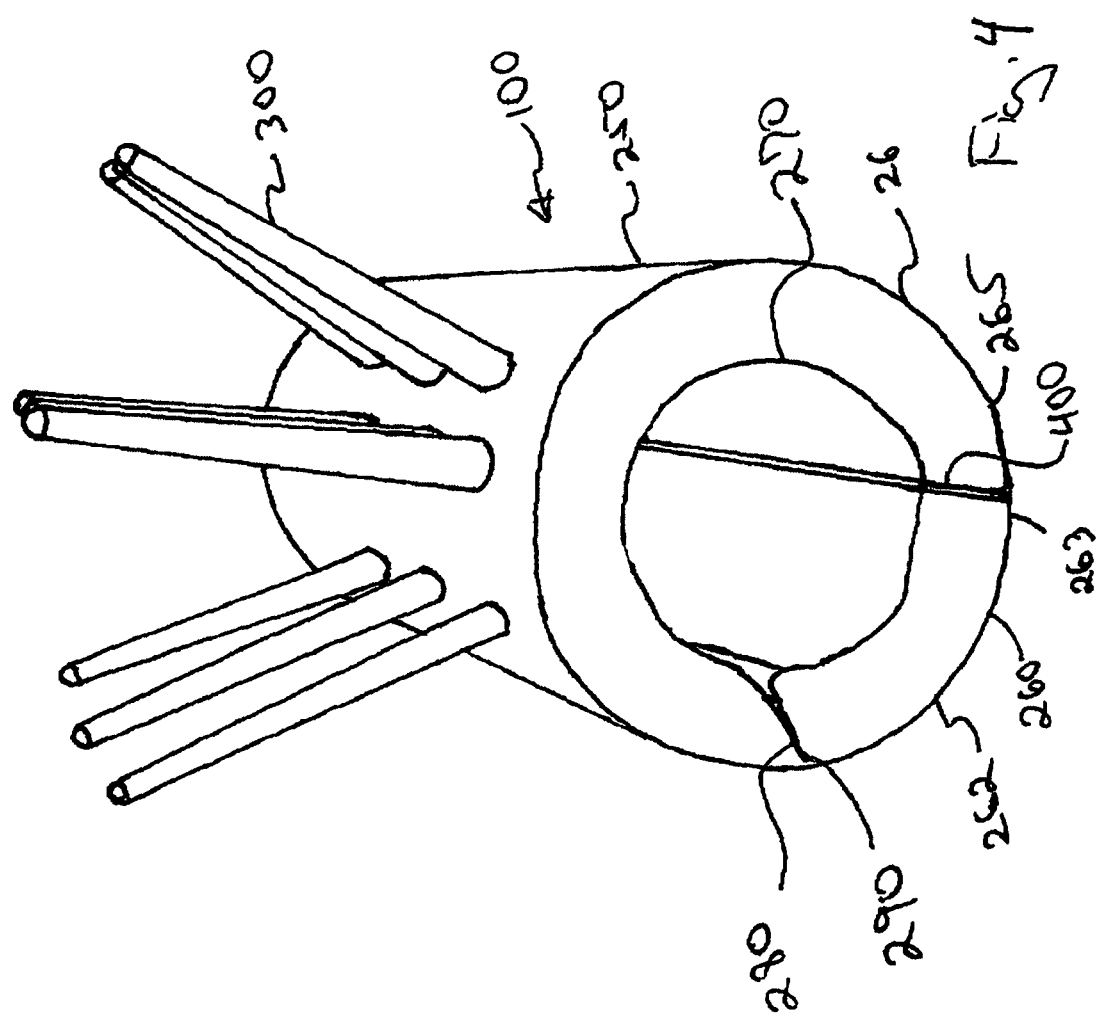

QUICK SNAP BIRD GUARD

CROSS-REFERENCE TO RELATED APPLICATIONS

This application claims priority to and is a continuation of U.S. application Ser. No. 12/459,182 filed on Jun. 26, 2009, which claims priority to and is a continuation-in-part of U.S. provisional application Ser. No. 61/133,378, filed Jun. 27, 2008.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in bird guards. More particularly, the invention relates to improvements particularly suited for railings, cable, and boat covers using hand rails or support structures. In particular, the present invention relates specifically to a flexible c-shaped channel with projecting spikes.

2. Description of the Known Art

As will be appreciated by those skilled in the art, bird guards are known in various forms. Patents disclosing information relevant to bird guards include: U.S. Pat. No. 564,591, issued to Clune et al. on Jul. 28, 1896; U.S. Pat. No. 3,362, 115, issued to Nyhus et al. on Jan. 9, 1968; U.S. Pat. No. 4,159,395, issued to Cogelia on Jun. 26, 1979; U.S. Pat. No. 4,309,072, issued to Tweeddale on Jan. 5, 1982; U.S. Pat. No. 4,815,896, issued to Fox, et al. on Mar. 28, 1989; U.S. Pat. No. 5,058,335, issued to Richter on Oct. 22, 1991; U.S. Pat. No. 5,433,029, issued to Donoho, et al. on Jul. 18, 1995; U.S. Pat. No. 5,596,834, issued to Ritter on Jan. 28, 1997; U.S. Pat. No. 5,615,524, issued to Costa, Sr. on Apr. 1, 1997; U.S. Pat. No. 6,226,933, issued to Nelson, et al. on May 8, 2001; and U.S. Pat. No. 6,640,506, issued to Landers on Nov. 4, 2003. Each of these patents is hereby expressly incorporated by reference in their entirety.

From these prior references it may be seen that these prior art patents are very limited in their teaching and utilization, and an improved bird guard is needed to overcome these limitations.

SUMMARY OF THE INVENTION

The present invention is directed to an improved bird guard using an elastic clamping body with extending projections. In accordance with one exemplary embodiment of the present invention, a bird guard is provided using a c-shaped clamping body with rounded projections for safe human interaction while still providing the bird guarding function. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 1 is an end perspective view of a bird guard.

FIG. 2 is an end perspective view of the bird guard of FIG. 1 clamped on a rail.

FIG. 3 is an end perspective view of another embodiment of a bird guard.

FIG. 4 is an the end perspective of FIG. 3 shown in a closed position.

DETAILED DESCRIPTION OF THE INVENTION

As shown in FIG. 1 of the drawings, one exemplary embodiment of the present invention is generally shown as a bird guard 100. The bird guard has a clamping body 200 supporting outwardly extending projections 300 defining a clamping aperture 201. The bird guard device 100 fits or wraps over boat railings and is intended to prevent birds from landing or roosting on the railings. This prevents damage to the boat caused by bird's themselves or their excrement.

The clamping body 200 is formed from a molded elastic material such as a plastic like polyvinylchloride, polyethylene, polystyrene or any other suitable elastic material. It is envisioned that the body 200 could be made from other materials such as metals or flexible woods, but the plastic is preferred to allow for non-mar clamping on surfaces without additional parts or material. The use of a soft plastic is preferred so that no harm is done to the item being protected. Further consideration should be given to the UV properties of the item and plastics that hold up well under long term sunlight exposure are preferred over degradable plastics for longevity of the device.

Similarly, in the preferred embodiment, the extending projections 300 are formed from the same material for ease of manufacturing. Note the tapered conical shape of the projection body 310 to save material and the flared base 320 that allows for the projections 300 to be supported off of the main clamping body 200. Also worthy of note is the rounded ends 330 that allow for the bird guards 100 to be safely handled without danger of piercing the user. The safe nature of the rounded ends 330 allows for the quick and easy installation of the bird guard 100 to provide protection without unnecessarily endangering the user or creating handling difficulties. This greatly contrasts with the prior art teachings of sharp or piercing types of projections.

FIG. 2 shows how the elastic ears 210 made from the elastic material of the body 200 can be expanded to slip over a railing 10 to protect the end 12 of the railing 10 from birds or bird droppings without having to require an additional clamp or holding structure that has to be additionally manipulated. This simple slip on elastic clamp design allows for easy installation and removal of the bird guard 100 without additional tools. As shown, the preferred embodiment includes a left ear 212, a projection supporting body 214, and a right ear 216. The opposing ears 212, 216 terminate in clamping ends 218 which are shown as points 219 in this embodiment. The points 219 are acceptable because of the non-marring nature of the plastic utilized in this design. Also provided in this design are drip edges 220 which work to help drain away water and keep the water from wicking inside the bird guard 100.

FIG. 3 shows an encasing version of the bird guard 100. This version of the bird guard 100 has a clamping and encasing body 250 supporting outwardly extending projections 300. In this embodiment, longer encasing ears 262, 264 are used that are shown defining a middle aperture 270. While the preferred embodiment uses a flexible material that does not require special treatment. FIG. 3 also shows how a body recessed hinge 280 may be implemented using a hinge line 282. It is further envisioned that a spring and pin piano hinge or other hinging systems could be utilized. In the preferred embodiment, the ears 262, 264 are provided with an adhesive strip 400 so that the end 263, 265 of the left and right encasing elastic ears 262, 264 may be adhesively joined together to capture a cable or the like in the middle aperture 270 formed by the encasing body 250. FIG. 4 shows the ends 263, 265 attached together and how the body recessed hinge 280 has closed to join the ends together. If the adhesive strip 400 is used, spring loading of the hinge is not as important such that a flexible, but less elastic material may be utilized.

Reference numerals used throughout the detailed description and the drawings correspond to the following elements:
railing 10
railing end 12
bird guard 100
clamping body 200
clamping aperture 201
elastic ears 210
left ear 212
projection supporting body 214
right ear 216
clamping ends 218
drip edges 220
clamping and encasing body 250
encasing elastic ears 260
left encasing ear 262
left encasing end 263
right encasing elastic ear 264
right encasing end 265
middle aperture 270
body recessed hinge 280
hinge line 282
outwardly extending projections 300.
projection body 310
flared base 320
rounded ends 330
adhesive strip 400

From the foregoing, it will be seen that this invention well adapted to obtain all the ends and objects herein set forth, together with, other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A bird guard apparatus for a support object, comprising:
a clamping body including a supporting body connected to elastic encasing ears forming an encased aperture;
the encasing ears including encasing ends;
a hinge connecting at least one elastic encasing ear to the support body;
an elastic hinge spring biasing the encasing ears toward the encased aperture;
an adhesive strip connecting the encasing ends; and
at least one outwardly extending projection connected to the supporting body, the outwardly extending projection including a conical shaped projection body connected to the supporting body by a flared base, each outwardly extending projection further comprising a rounded end.

2. The apparatus of claim 1, the hinge further comprising:
a body recessed hinge defining a hinge line.

* * * * *